Figure 1:
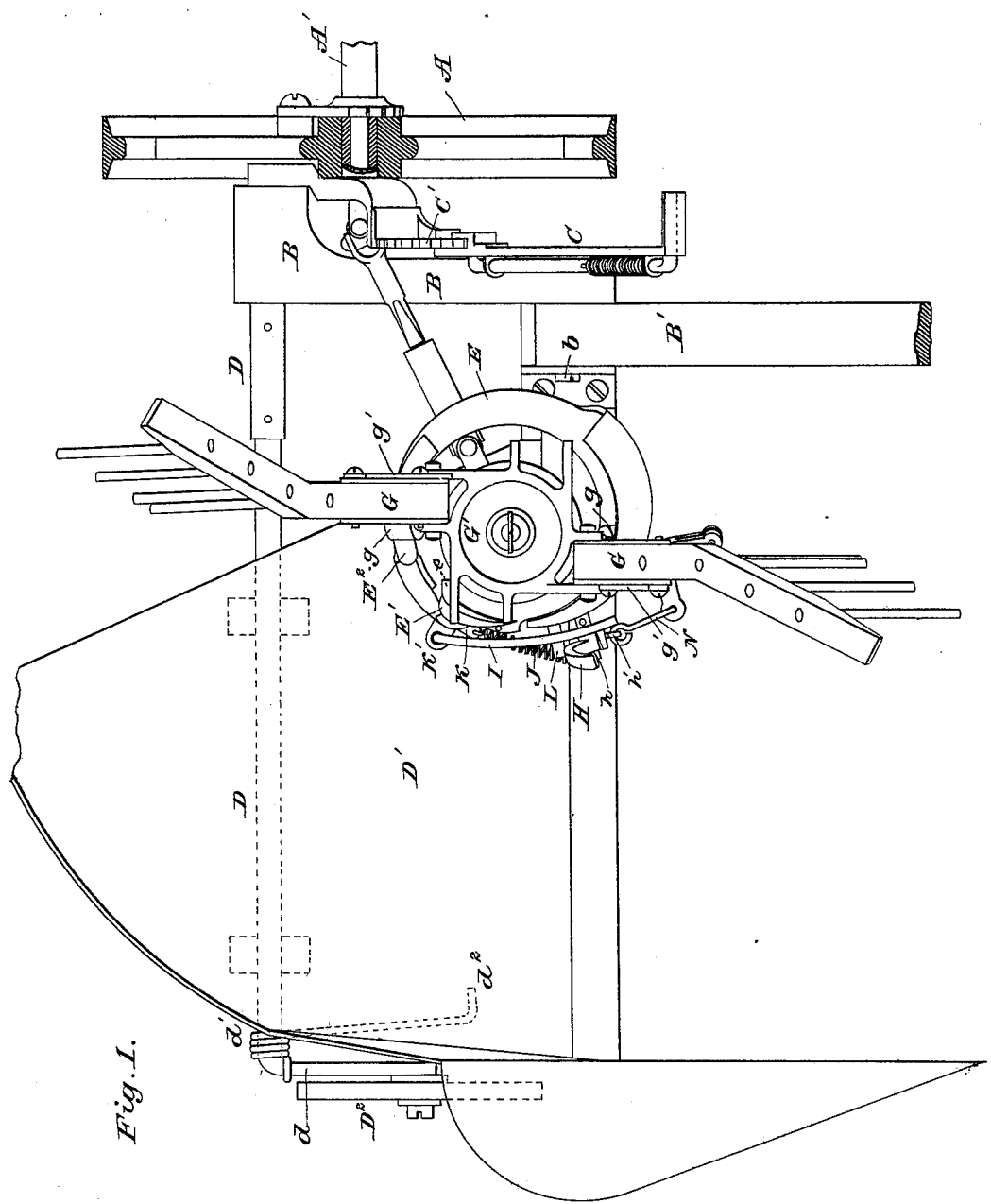

3 Sheets—Sheet 1.

J. BORDWELL.
Harvester.

No. 229,584. Patented July 6, 1880.

WITNESSES
Wm. A. Skinkle.
R. F. Barnes

INVENTOR
Joseph Bordwell.
By his Attorneys
Baldwin, Hopkins & Peyton.

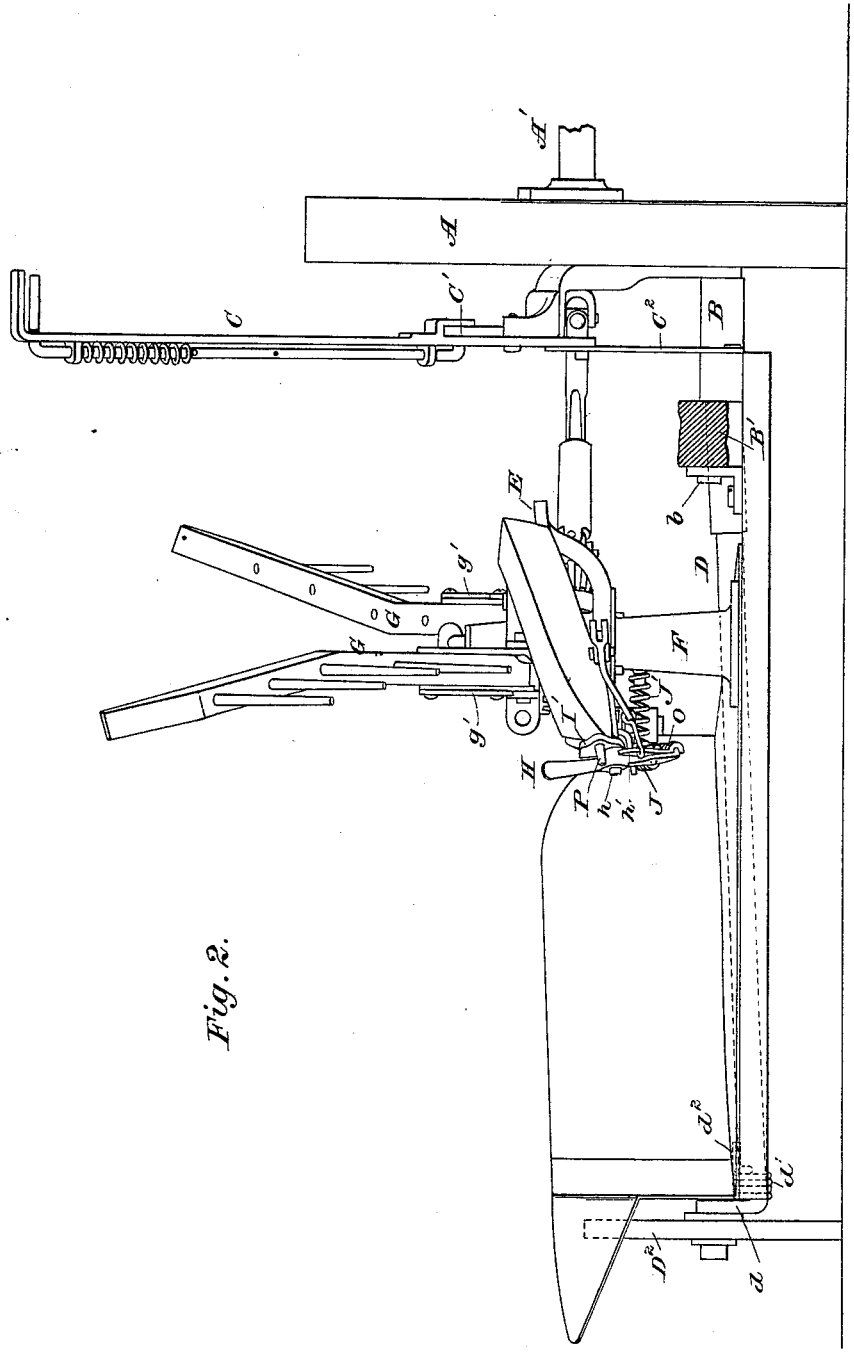

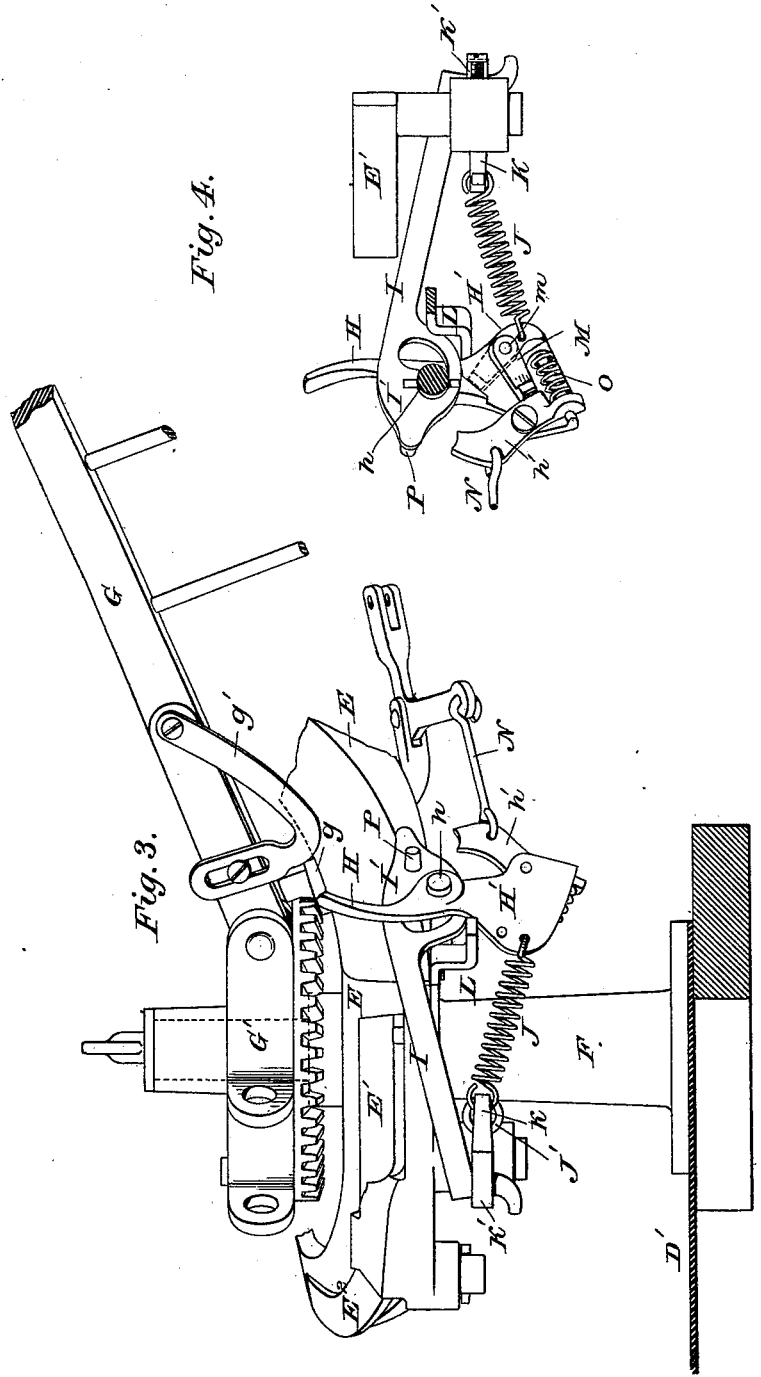

UNITED STATES PATENT OFFICE.

JOSEPH BORDWELL, OF BROCKPORT, NEW YORK, ASSIGNOR TO DAYTON S. MORGAN, OF SAME PLACE.

HARVESTER.

SPECIFICATION forming part of Letters Patent No. 229,584, dated July 6, 1880.

Application filed February 20, 1880.

*To all whom it may concern:*

Be it known that I, JOSEPH BORDWELL, of Brockport, in the county of Monroe and State of New York, have invented certain new and useful Improvements in Harvesters, of which the following is a specification.

My invention relates mainly to improvements in that class of single-driving-wheel grain-harvesters which are provided with rising and falling combined reel and rake arms, controlled by cams and rotating about upright posts or vertical axes mounted upon vertically-adjustable and tilting finger-beams or grain-platforms, and at or near the heel ends of the cutting apparatus.

Types of this class of machines are shown in Letters Patent of the United States No. 218,615, granted my assignee, Dayton S. Morgan, August 19, 1879, and No. 216,960, granted Samuel Johnston, July 1, 1879. In this last-mentioned patent the raking and reeling devices are omitted. The machine shown, however, is in some respects similar to that upon which my improvements are engrafted, especially as regards the devices for raising and lowering and tilting the platform and cutting apparatus.

My invention consists in improvements in devices for overcoming the tendency of the outer end of the finger-beam and the platform at its front outer portion to sag or twist downward, and by so doing injuriously depress the point of the divider; and, further, my invention consists in improvements in the raking and reeling devices, consisting, regarded as an entirety, in an organization whereby, first, one or more combined reel and rake arms may be caused automatically or normally to rake, and yet admit of the driver in his seat, at will, causing the arm or arms to reel simply; second, all or any desired number of the arms may be caused to rake automatically and be beyond the control of the driver in his seat; third, all the arms may be set to operate automatically as reels merely, while leaving them under the control of the driver in his seat, so that he may, at will, throw any arm or arms into raking operation.

The subject-matter claimed is hereinafter specifically designated.

In the accompanying drawings I have shown such parts only as are deemed necessary to illustrate my invention. Obviously some of my improvements may be used without the others, and my invention be adapted to harvesters differing in some respects from the machine therein partially shown, and hereinafter particularly described.

Figure 1 is a plan or top view, with the driving-wheel in section and parts broken away, with only two rake and reel arms in place. Fig. 2 is a front elevation. Fig. 3 is an elevation, as seen from the inner or grain side of the machine, of the supporting and controlling mechanism for the rake and reel arms, with parts broken away and in section; and Fig. 4, an elevation as seen from the opposite side, showing details of the controlling mechanism, some parts being in section.

It is deemed unnecessary to describe all of the parts of a fully-organized harvester, with which my improvements are designed to be used, as those features which are not particularly described and others which are not referred to may be of any suitable construction—such, for instance, as in the one or the other of the before-referred-to Patents Nos. 216,960 and 218,615.

A single driving and main supporting wheel, A, is mounted on an axle, A'. A suitable main frame and proper gearing are provided, and from the axle is suspended a frame, B, having pivotal connection, $b$, with the heel of the tongue B', about which the main frame may be rocked by suitable means to tilt the platform and cutting apparatus.

The supplemental frame B—that for raising and lowering the platform—is operated by the lever C, in connection with its spring-detent and engaging-rack C' and the link $C^2$.

The devices so far described are essentially similar to the corresponding parts in the machine shown in the before-referred-to Patent No. 216,960, and, as described in said patent, a cranked shaft, D, extends across and beneath the platform D', and supports a grain-wheel, $D^2$, at its outer end upon the cranked portion $d$. Instead of employing a torsional spring and securing and locating it, as in said patent, so as to bear upward against the platform near its center, or about midway between its inner and outer ends and considerably in rear of the finger-beam, I make use of a coiled spring, $d'$, secured about the straight portion of the shaft D at or near where it is bent to form the crank $d$. The free end $d^2$ of the spring bears against the under side of the platform near its front edge and close to its outer end.

By this construction the pressure of the spring is applied where it is most effective in overcoming the tendency of the platform and finger-beam to sag or twist, leverage is increased, and the dip or depression of the divider-point effectually prevented at any height of cut to which the cutting apparatus is adjusted, as the degree of resilience or amount of play throughout which the spring works efficiently is amply sufficient to suit all the adjustments.

As a result of this construction not only is material aid afforded by the spring in adjusting the platform regardless of the height of cut or opposite inclinations of the platform and crank of the shaft, but there is effectually accomplished the main object aimed at herein—viz., the prevention of the injurious dip of the divider, and consequent catching of its point in the ground, roots, &c., which depression or tendency to dip of the divider results from the torsional strain, sag, or twist of the front portion and outer end of the platform and of the finger-beam, due in part to the weight of the divider reaching beyond the beam, and in part to the downward strain exerted on it by the drag of the grain, &c.

As the spring is coiled loosely directly about the outer end of the shaft D, or close to its crank $d$, instead of being mounted on this crank, it is obvious that for all practical purposes the action of the spring at its free end $d^2$ on the platform is uniform throughout the variations in the inclination of the platform, instead of quickly varying as the platform is adjusted, and materially differing in its pressure, if not wholly ceasing to operate, every time the crank of the shaft is depressed or moved down as the platform is moved up at front.

The raking and reeling devices are for the main part, or in general construction, identical with the corresponding parts in the before-recited Patent No. 218,615. As described in said patent, the rake-track or controlling-cam E is mounted on a post, F, and pivoted rake and reel arms G, in suitable number, are carried by the revolving plate or wheel G', driven by the tumbling-shaft and connected gearing. The arms G have cam-traveling rollers $g$ and adjustable striker-arms or tripper-pieces $g'$, and the cam is provided with pivoted gates or swinging latches E' E², and with suitable fixed portions or unchangeable tracks, as in my prior invention, patented as above stated. A tripping-latch, H, mounted at the side of the cam on a horizontal pivot, $h$, is provided with a vertically-rocking trip-arm or pivoted dog, $h'$, mounted upon the inner side of its broad lower end or head, H'. A spring bears against the heel of this dog at one side, and play of the dog in the opposite direction is limited by a stop. The dog is connected by a link with an elbow-lever at the front of and beneath the cam, and this lever is operated by suitable connections under the control of the driver. The tripping arm or dog $h'$ is adapted to abut at its end against a lug on a cam-gate-actuating arm, I, this arm being provided with a slotted head, I', to engage with and play upon the pivot $h$ of the tripping-latch H. A light contractive or pull spring, J, connects the rear of the broad lower part or head, H', of the latch H with an arm, K, projecting forwardly from the vertical pivot of the cam-latch or swinging gate E', and an expansive or thrust spring, J', stronger than the spring J, connects the arm K with the rake-post.

The function of the spring J being mainly to hold the latch H in its normal position, it might be dispensed with; but I prefer to use it.

The gate-actuating arm I is linked to an arm, K', on the gate-pivot, projecting outwardly sidewise therefrom at a right angle to the arm K. The gate E' has a heel-projection, $e$, extending crosswise of the cam-track when the gate is set for raking.

So far as above described the raking and reeling devices are identical with those shown in the Patent No. 218,615 for my prior invention, and for a more full and detailed description of the construction and operation of such parts reference is made to said patent.

Instead of, as before, locating a stop on the fender or grain-guard to limit the rearward movement of the lower part or heel, H', of the tripping-latch, I provide a stop-arm, L, secured to the under side of the cam-plate and projecting across the path of movement of the latch.

In a simple, inexpensive way, involving the addition of but a single piece, I have converted the machine from one in which the operation was for one or more combined rake and reel arms to act as rakes, unless such action was intermitted by the driver, into a machine adapted to operate in any one of three ways—that is, first, as before, or, as in the machine patented as No. 218,615, by the action of the striker-arms or tripper-pieces $g'$ on the tripping-latch H and the mechanism connected with it and the cam-gate E; second, as a positive raker, the parts being so adjusted as to render the operation of the arms incapable of control by the driver from his seat, thus delivering the grain either in a continuous swath or depositing the gavel at regular intervals, according to whether all or part only of the arms are set to act as rakes; third, automatic in operation as a reel only, while leaving the driver free to control the action of the arms, so as to throw them into operation as rakes at will, and without dependence upon the action of the tripper-pieces on the arms.

I attain the ends in view by the employment of a suitable adjustable controller, stop, or dogging device, by which the play of the pivoted dog $h'$ may be prevented, so that this dog, practically considered, becomes as though rigidly attached to or formed in one part with the head $H'$ of the tripping-latch, and has therefore no movement independently thereof. This dogging device, in this instance, consists of a turning button or vertically-rocking stop-arm, M, pivoted at $m$ upon the inside of the tripping-latch head $H'$. Sufficient frictional contact should be created between the button and the tripping-latch head to prevent accidental movement of the button upon its pivot. An elastic washer might be inserted between the button and its support, so that the compression of the washer would have a tendency to hold the button against accidental movement, whether thrown up out of the way, as in dotted lines, or in its operative position. (See Fig. 4.)

A positively-acting holding device may be applied to the button, such as a set-screw, to lock it in either of its positions.

When the button is adjusted as shown in full lines in the drawings, strain upon it resulting from a pull on the link N is transferred wholly to the tripping-latch, just as though the link were connected to the latch-head, instead of to the dog $h'$. The result is, that there is no play of this dog on its pivot by the yielding of the spring O, which would result were the button thrown up. Consequently the dog $h'$ is caused, as the tripping-latch head $h'$ is rocked forward, to abut against the stud P on the arm I and release it from its lowermost position, thus allowing it to move backward and leave the spring J free to operate the cam-gate $E'$. It will thus be seen that the result of pulling on the link N when the button is set is just the contrary to the effect produced by pulling on the link when the button is thrown up, as in the latter case the dog $h'$ would be rocked outward at top and fail to release the arm I, against which it would not strike.

If it be desired to have the machine rake automatically in the second way before referred to, the stop-button is adjusted as in full lines and the tripper-pieces $g'$ adjusted so as to strike the tripping-latch H, rock it backward and downward, and rock forward and upward its head or lower part, $H'$, thus causing the dog $h'$ to operate upon the arm I.

To operate in the third way mentioned above, the button is left in the same position as in full lines and the tripper-pieces $g'$ adjusted so that they will be inoperative or not touch the tripping-latch point H.

An arm may be thrown into operation, when desirable, by a pull on the link N by the driver.

I claim as of my own invention—

1. The combination of the platform, the cranked shaft, the grain-wheel, the coiled spring secured to said shaft and extending forwardly, and bearing at its free end beneath the platform and near the outer end thereof, or close to the divider-heel, and the raising and lowering devices, these members being and operating substantially as hereinbefore set forth.

2. The combination of the platform, the cranked shaft D $d$, the grain-wheel, and the spring secured to said shaft near its crank, extending forwardly therefrom, and bearing at its free end $d^2$ against the under side of the platform at or near its outer front corner, substantially as and for the purpose hereinbefore set forth.

3. The combination, substantially as hereinbefore set forth, of the combined rake and reel arms, the cam, adjustable strikers or tripper-pieces and cam-track-traveling rollers or studs on the arms, the cam-gate, its actuating-arm, the vibrating tripper, the pivoted spring-dog thereon, its link-connections, and means by which to lock said dog against movement independently of the tripper, substantially as described.

4. The combination of the vibrating tripper, the pivoted dog mounted on the lower part or head of said tripper, the spring bearing on the dog, and the turning button to lock the dog, substantially as hereinbefore set forth.

5. The combination, substantially as hereinbefore set forth, of the rake and reel arms, their rollers or cam-track-traveling studs, the cam, its pivoted gate, the gate-actuating arm, slotted at the forward end, the pivot embraced by the slot of said arm, the spring for turning the gate, the tripper vibrating about the pivot which is engaged by the gate-actuating arm, the dog, and the link and its connections, by which to vibrate the tripper, and with it the dog, to release the gate-actuating arm and convert into a rake an arm before operating simply as a reel.

In testimony whereof I have hereunto subscribed my name.

JOSEPH $\overset{\text{his}}{\times}$ BORDWELL.
mark.

Witnesses:
E. T. LAMB,
H. C. HAMMOND.